Nov. 13, 1951  B. BANNISTER  2,574,773
ROLL MOUNTING
Filed Aug. 21, 1945

*Inventor:*
BRYANT BANNISTER,
by: Donald P. Dalton
his Attorney.

Patented Nov. 13, 1951

2,574,773

UNITED STATES PATENT OFFICE 2,574,773

ROLL MOUNTING

Bryant Bannister, Pittsburgh, Pa., assignor to National Tube Company, a corporation of New Jersey Application August 21, 1945, Serial No. 611,856

4 Claims. (Cl. 287—53)

This invention relates to improvements in roll mountings and more particularly to a mounting for rotary disc rolls such as are employed in seamless tube mills.

In mounting rolling mill rolls, and in particular disc rolls for rotary rolling mills such as are used for making seamless pipe, it is common practice to taper the spindle head on which the roll is held by clamps and the like. After the mill has operated a short time, during which heating and expansion of the roll occurs, it is necessary to stop the mill and tighten the clamps or roll holding devices. Such stoppage results in loss of production and also a certain amount of wear and damage to the tapered surfaces takes place due to the loosening of the roll, permitting lost motion or play between the roll and the spindle. After the heated and expanded roll is tightened on the spindle, it has a tendency to become firmly set thereon necessitating considerable time and difficulty in removing it when it is desired to change rolls.

An object of the present invention is to overcome the foregoing difficulties in conventional roll mountings and provide a mounting which keeps the roll firmly seated on the spindle at all times.

Another object of the present invention is to provide a roll mounting which permits ready removal of the roll from the spindle.

A further object of the present invention is to provide a sealed-in roll mounting that minimizes loss of lubricant and inhibits infiltration of dust and dirt.

Still another object of the present invention is to provide a roll mounting which is simple in design and durable in operation.

The foregoing and further objects will be apparent from the specification and drawings, wherein.

Figure 1:
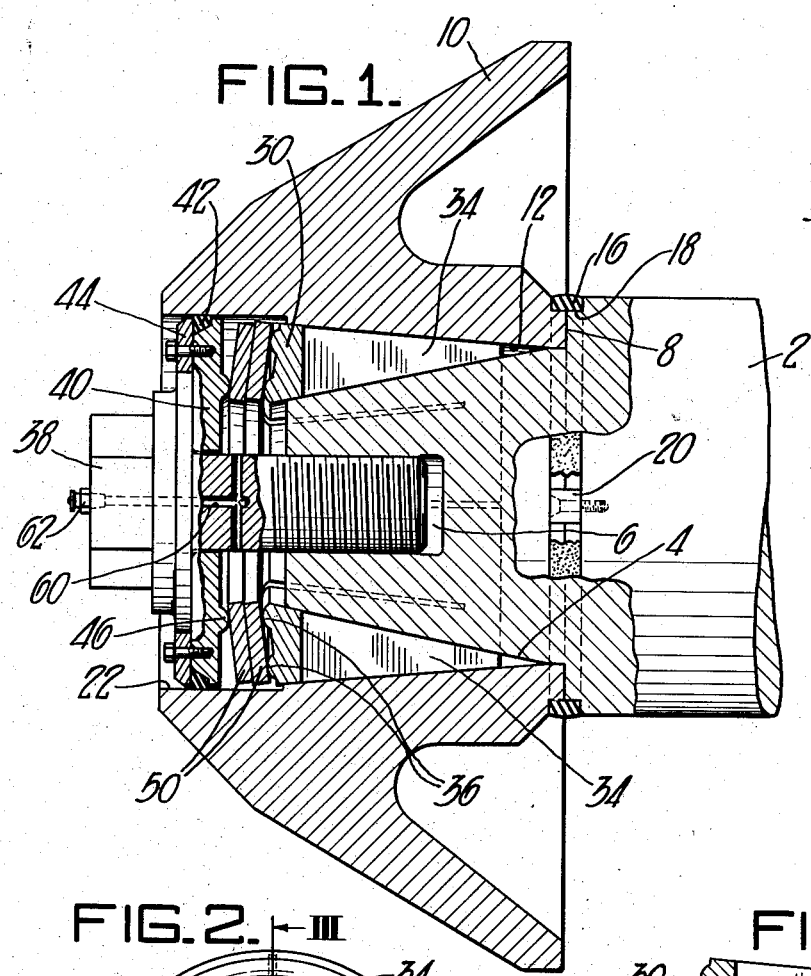
Figure 1 is a longitudinal section of a roll and spindle embodying the improved mounting of my invention.

Referring more particularly to the drawings, the numeral 2 designates a conventional rolling mill spindle connected to a suitable source of power (not shown). The head of the spindle is suitably tapered as at 4 with a threaded bore 6 in the outer end thereof. A shoulder 8 is provided at the inner end of the tapered portion.

A conventional rotary disc roll 10 for expanding tubular workpieces which may have a tapered bore 12 is disposed around the tapered portion 4 of the spindle and is abutted against the shoulder 8 adjacent the end of the tapered section 4. A seal 16 composed of a ring of synthetic rubber or other suitable oil and grease resistant material is interposed between the roll and spindle and is seated in a recessed portion 18 between the abutting surfaces. The roll is keyed to the spindle for conjoint rotation as at 20. The outer end of the roll bore is counterbored as at 22.

Disposed in the tapered annular opening between the roll and spindle is an expansible quill or collet member 30 having its inner and outer surfaces profiled to match the spindle and roll surfaces. The taper 4 on the spindle and the inner surface of the quill should be beyond the friction angle so that the members will not become locked. The quill 30 is composed of steel or material having similar properties and has slots 32 and 34 extending from either end thereof to make it slightly expansible. The outer or thick end of the quill is provided with a pair of annular ribs or projections 36, the inner rib projecting outwardly slightly farther than the outer rib.

Figure 4:
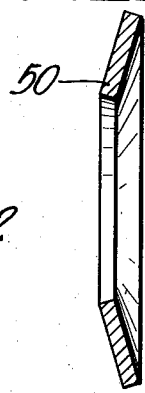
Figure 4 is a cross section of one of the spring members.
Figure 2:
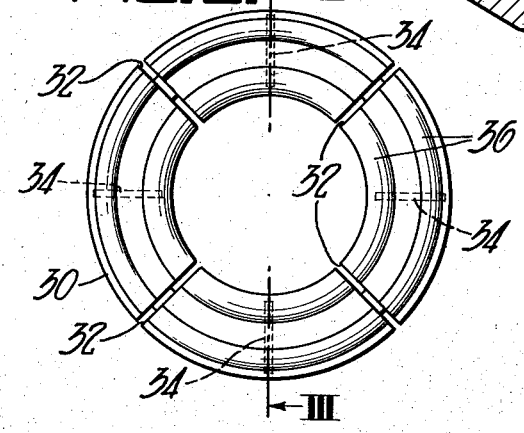
Figure 2 is an end view of the expansible quill.
Figure 3:
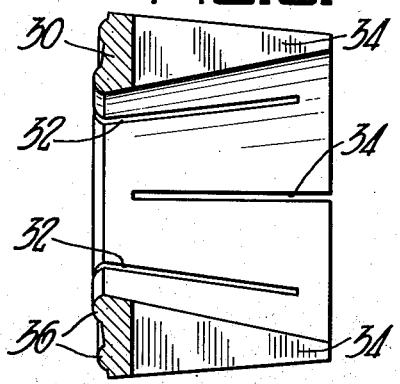
Figure 3 is a section on lines III—III of Figure 2.

The quill and roll are held tightly on the spindle by means of a cap screw 38 extending into the bore 6. The cap screw bears against a ring member 40 which is of slightly smaller diameter than the counterbore 22 in the disc roll. A sealing ring 42 is contained at the outer edge of the ring 40 to make a sealing fit with the counterbore 22 by means of a removable annular ring 44. The ring 40 has an inner annular rib or projection 46 in substantial horizontal alignment with the inner rib 36 on the quill. Disposed between the ring 40 and the quill is a pair of annular spring members 50. As shown in Figure 4, the members are considerably dished in their unsprung condition so that when they are partially or completely flattened out they exert a thrust or pressure longitudinally of the bore. Thus, when the cap screw is tightened up, there is a direct thrust through the rib 46, springs 50, onto the quill through its inner rib 36. This forces the quill inwardly and also pushes the roll tightly against the shoulder 8. At the same time, the spring members are somewhat flattened so that they exert a thrust against the quill through the outer rib 36. Thus, when the roll is placed in operation, and due to becoming heated expands slightly, the spring members 50 will force the quill inwardly and thus force it into tight engagement with the bore of the roll. Consequently, the roll never becomes loose upon the spindle due to expansion, and thereby wear of these surfaces is prevented. In addition, the parts do not become wedged or locked together upon cooling whereby the roll is readily removable from the hub.

A T-shaped bore 60 is provided in the cap screw with a suitable fitting 62 at the outer end thereof so that lubricant may be provided for the quill 30 and springs 50. Due to the seals 16 and 42, the grease is retained between the roll and spindle, and dust and dirt are prevented from entering therein.

While I have shown and described one specific embodiment of my invention, it will be understood that this embodiment is merely for the purpose of illustration and description and that various other forms may be devised within the scope of my invention, as defined in the appended claims.

I claim:

1. In a device of the character described comprising a spindle having a hub and a roll surrounding the hub, said hub being tapered and provided with a shoulder at its inner end, said roll abutting said shoulder whereby there is provided a tapered annular opening between the roll and the hub, an expansible collet in said tapered opening and resilient means urging said collet inwardly of said opening to maintain said roll constantly in close engagement with said shoulder and to maintain a tight connection between said roll and said hub when said roll expands due to being heated without axial movement of said roll.

2. In a device of the character described comprising a spindle having a hub and a roll surrounding the hub, said hub being tapered and provided with a shoulder at its inner end, said roll abutting said shoulder whereby there is provided a tapered annular opening between said roll and hub, an expansible annular collet in said tapered opening, at least one dished annular spring disposed at the outer end of said collet and in engagement therewith, means engaging said dished spring to force said collet inwardly of said opening and thereby bring said roll into engagement with said shoulder, said dished spring being compressed by said last named means whereby said compressed spring forces said collet inwardly of said opening to maintain said roll constantly in engagement with said shoulder and to maintain a tight connection between said roll and said hub when said roll expands due to being heated without axial movement of said roll.

3. In a device of the character described comprising a spindle having a hub and a roll surrounding the hub, said hub being tapered and provided with a shoulder at its inner end, said roll abutting said shoulder whereby there is provided a tapered annular opening between said roll and hub, an expansible annular collet in said tapered opening, at least one dished compression spring disposed adjacent the outer end of said collet, a washer engaging said dished spring, said washer having a seal engaging said roll, screw means acting against said washer to compress said spring and bring said roll into tight engagement with said shoulder, said compressed dished spring acting to force said collet inwardly of said opening to maintain said roll in engagement with said shoulder and to maintain a tight connection between said roll and said hub when said roll expands due to being heated and means for delivering a lubricant to said collet and spring behind said washer.

4. In a device of the character described comprising a spindle having a hub and a roll surrounding the hub, said hub being tapered inwardly from a point adjacent the spindle towards its outer end providing a tapered annular opening between said hub and roll and having a shoulder at its inner end, an expansible annular collet in said tapered opening, the outer end of said collet being tapered from the outer edge thereof toward said hub and having an annular rib on said outer end adjacent the inner edge thereof, a dished annular spring engaging the outer end of said collet, said spring being dished in the same direction as the taper on the end of said collet but the amount of the dishing thereof exceeding the taper on the end of said collet, a washer disposed around the outer side of said spring, said washer having an inwardly extending annular rib in axial alignment with the annular rib on said collet, screw means acting against said washer to cause inward pressure on said collet through said annular ribs and the interposed spring to bring said roll into engagement with said shoulder and to compress said spring, said compressed spring acting to force said collet inwardly when the roll expands due to heating to keep a tight connection between said roll and said hub without axial movement of said roll and to maintain said roll constantly in tight engagement with said shoulder.

BRYANT BANNISTER.

REFERENCES CITED

The following references are of record in the file of this patent:

UNITED STATES PATENTS

| Number | Name | Date |
|---|---|---|
| 955,160 | Holmes | Apr. 19, 1910 |
| 1,687,777 | McMurtrie et al. | Oct. 16, 1928 |
| 2,190,371 | Taylor | Feb. 13, 1940 |
| 2,278,625 | Traylor et al. | Apr. 7, 1942 |

FOREIGN PATENTS

| Number | Country | Date |
|---|---|---|
| 126,958 | Great Britain | May 27, 1920 |
| 29,554 | Netherlands | Mar. 16, 1933 |
| 706,590 | Germany | May 29, 1941 |